United States Patent
Uros et al.

(10) Patent No.: US 6,370,851 B1
(45) Date of Patent: Apr. 16, 2002

(54) CUTTING DEVICE OF AN AGRICULTURAL HARVESTING MACHINE

(75) Inventors: Raymond Uros; Jérôme Simon, both of Rigny; Jérôme Repellin, Autrans; Aurelien Chabassier, Dampmart, all of (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/691,399

(22) Filed: Oct. 18, 2000

(30) Foreign Application Priority Data

Oct. 21, 1999 (DE) .......................................... 199 50 750

(51) Int. Cl.⁷ .......................... A01D 39/00; A01D 90/04
(52) U.S. Cl. ....................... 56/10.2 R; 56/341; 100/88; 460/112
(58) Field of Search .............................. 100/87, 88, 89, 100/3, 4, 5; 56/341, 343, 342, 10.2 R, 10.2 D, 10.2 J; 144/41, 24.13, 335, 338, 343; 33/645, 655, 286, 628; 299/1.5; 460/112, 111

(56) References Cited

U.S. PATENT DOCUMENTS

| | | | | |
|---|---|---|---|---|
| 3,572,663 A | * | 3/1971 | Van Der Lely | ................ 34/216 |
| 3,731,477 A | * | 5/1973 | Coon | ........................ 56/327.1 |
| 4,955,188 A | | 9/1990 | Von Allworden | |
| 5,231,828 A | * | 8/1993 | Swearingen et al. | .......... 56/341 |
| 5,802,825 A | | 9/1998 | Chow et al. | |
| 5,832,975 A | * | 11/1998 | Hamby, Jr. | ............... 144/24.13 |

FOREIGN PATENT DOCUMENTS

| | | |
|---|---|---|
| DE | 295 16 835 U1 | 2/1996 |
| DE | 197 17 542 A1 | 10/1998 |
| EP | 0 205 854 | 12/1986 |
| EP | 0 689 760 A1 | 1/1996 |
| GB | 2 032 376 | 5/1980 |

* cited by examiner

Primary Examiner—Robert E. Pezzuto

(57) ABSTRACT

A baler for making large cylindrical bales is equipped with a cutting device for cutting picked up crop into pieces before it enters the baling chamber. The cutting device includes a plurality of cutting knives that are pivotable about a horizontal transverse axis between an working position for cutting crop, wherein the knives each project upwardly through respective slits provided in a guide sheet, and a non-working position wherein the knives are withdrawn to a non-working position substantially below the guide sheet. A plurality of knife positioning elements are respectively associated with the knives and mounted for pivoting about a second horizontal transverse axis such that when the positioning elements are in a first position corresponding to the working position of the knives rollers respectively carried by the positioning elements are in engagement with a recess in a surface provided on the rear of the associated knife. The positioning elements are biased such that the roller carried by a given positioning element will remain in the recess of the associated knife so long as the force tending to rock the knife to its non-working position is below a predetermined amount. Once this force is exceeded, the knife will pivot to its non-working position until the force once again falls below the predetermined amount. A sensing device is associated with a warning or indicator circuit for letting the operator know when one of the knives has moved to a position not occupied by the remaining knives.

8 Claims, 4 Drawing Sheets

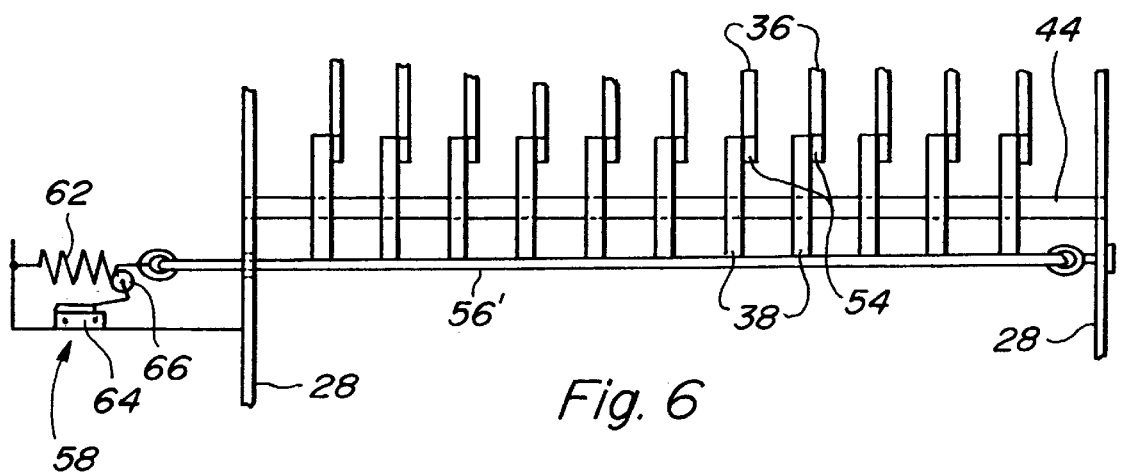
Fig. 6
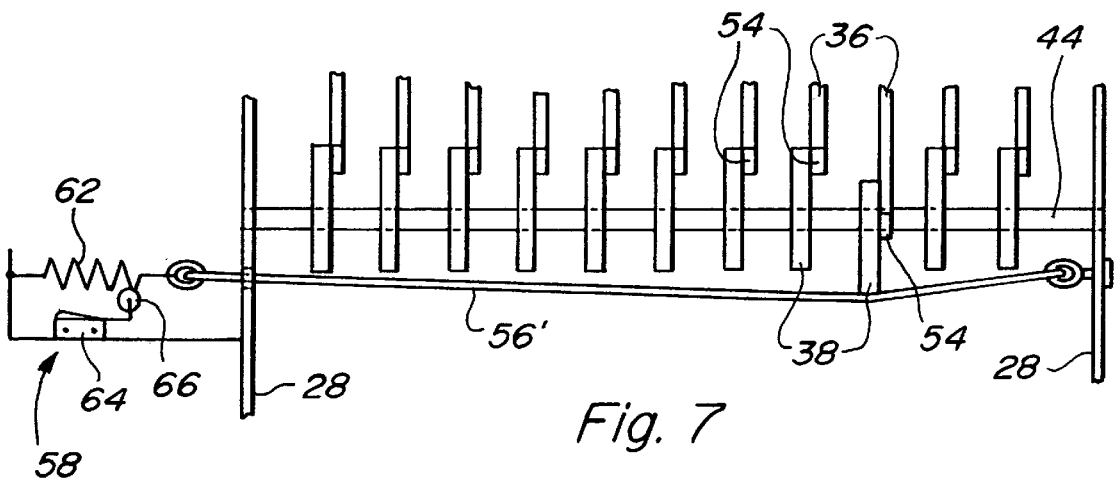
Fig. 7
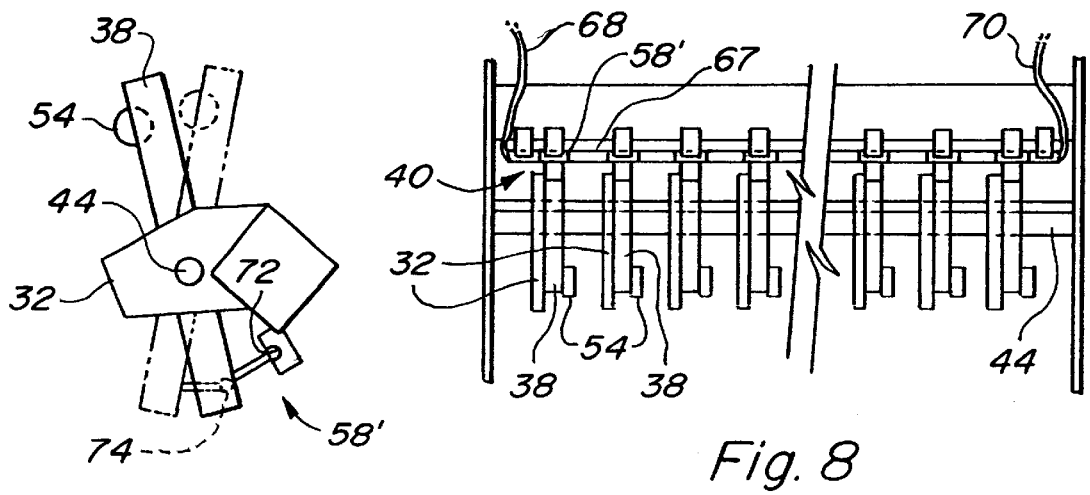
Fig. 9
Fig. 8

CUTTING DEVICE OF AN AGRICULTURAL HARVESTING MACHINE

The invention concerns a cutting device of an agricultural harvesting machine with several knives arranged alongside each other, that can be repositioned between at least two positions.

BACKGROUND OF THE INVENTION

DE-A1-197 17 542 discloses a cutting device for an agricultural harvesting machine, for example, a large round baler. This cutting device is equipped with an electronic, optical or mechanical sensor that detects when several knives are not in cutting position and thereby the number of cutting knives has been changed. With this information, the pressure for the repositioning of all knives is controlled in order to assure that they do not offer too great a resistance to deflection upon encountering foreign objects on the one hand, and no inadequately small resistance to deflection for the cutting operation on the other hand.

The problem underlying the invention is seen in the fact that this device can assume that when only a single knife is pivoted that this knife was purposely pivoted in order to change the number of knives able to cut and to increase the retaining pressure on all knives.

SUMMARY OF THE INVENTION

According to the present invention, there is provided an improved cutting device for an agricultural machine.

An object of the invention is to provide a cutting device of the type including a plurality of transversely spaced, individually pivoted knives movable between operating and non-operating positions and to provide a sensor for determining if even just one of the set of knives has pivoted from a position occupied by the remaining knives.

A more specific object according to one embodiment is to provide a knife assembly as set forth in the previous object wherein a tie bar arrangement spans all of the knives and is deflected if any one of the knives moves from its working or operating position, this deflecting effecting operation of a sensor. The tie bar may be a wire, a steel cable, a chain, a rod or the like that is strongly tensioned in each case with the sensor being a switch that is operated by nearly every movement of the tie bar. If desired, the switch may be located in circuitry including a time delay element which would prevent the operation of the switch from energizing a warning device when the movement of the knife from its operating position is only transitory, i.e., of short duration.

Another object according to a different embodiment is to provide a variation of the tie bar where it is constructed of first and second sets of electrical conducting segments of an electrical lead with the first and second sets of segments establishing a current path from end to end through the lead when the knives are all in a working position and with the first set of segments respectively being carried by individual knife positioning elements such that an open circuit is established in said lead when any one of the individual knives pivots to a non-working position.

These and other objects of the invention will become apparent from a reading of the ensuing description together with the appended drawings.

BRIEF DESCRIPTION OF THE DRAWINGS

FIG. 6 is a schematic top plan view of just the knife positioning elements and associated cutting knives of the cutting device, according to a second embodiment, with all knives shown being in respective operating positions.

FIG. 7 is a view like that of FIG. 6 but showing one knife pivoted to its non-operating position.

FIG. 8 is a schematic bottom view of the knife positioning elements of the cutting device, according to a third embodiment, with all of the knife positioning elements being shown in the position they occupy when all of the knives are in their respective operating positions.

FIG. 9 is a side view of the knife positioning elements shown in FIG. 8 but with the baler side sheets omitted, with the knife positioning elements being shown in solid lines in a first position they occupy corresponding to the working position of the knives, and with one of the knife positioning elements being shown in dashed lines in a second position corresponding to that which it would occupy when the associated knife is in its non-operating position.

DESCRIPTION OF THE PREFERRED EMBODIMENT

Figure 1:
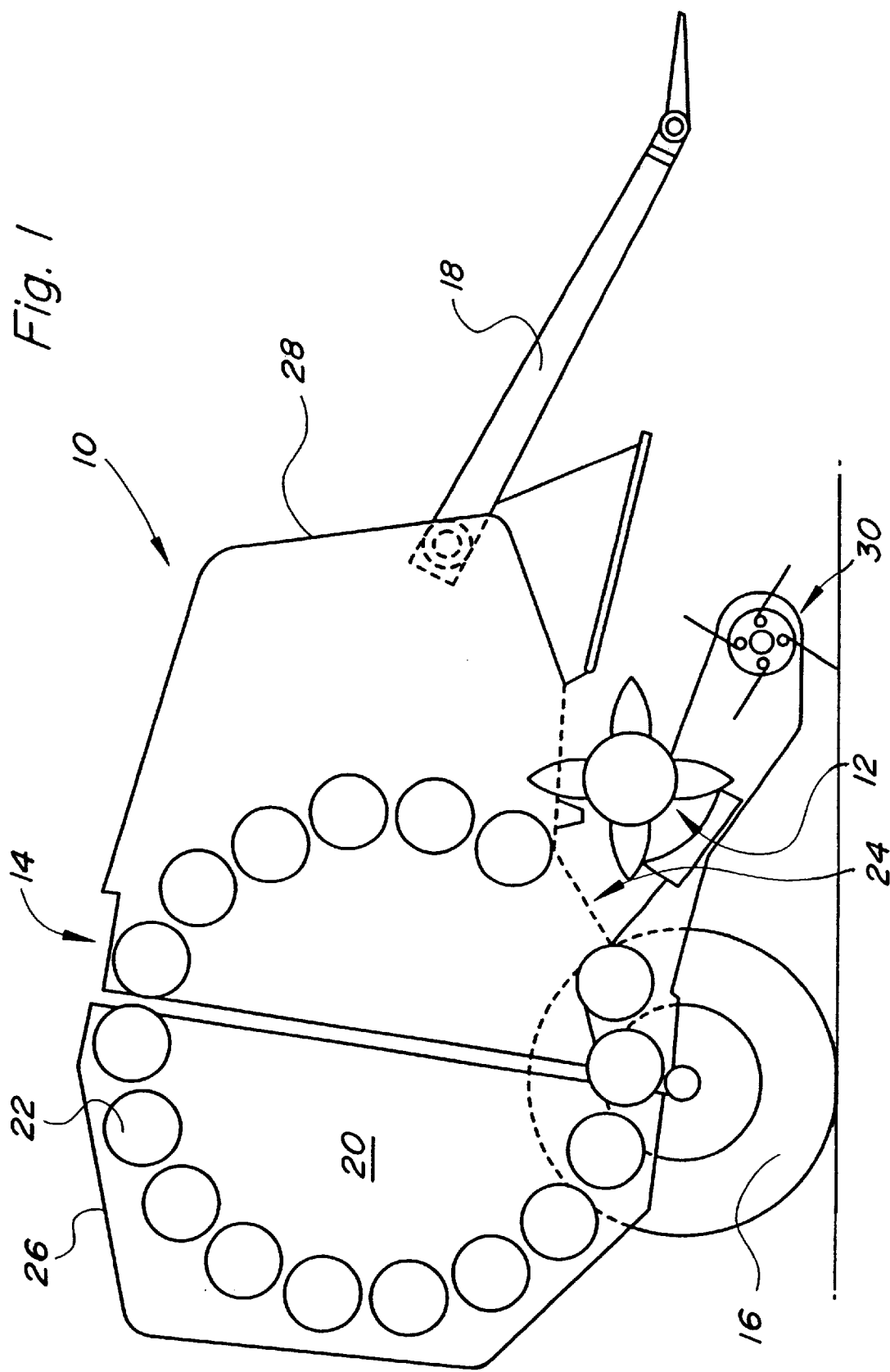
FIG. 1 is a schematic left side view of a large round baler with which the present invention is useful.

Referring now to FIG. 1, there is shown a harvesting machine 10, configured as a large round baler, and equipped with a cutting device 12 according to the invention. The cutting device 12 could also find utility with other harvesting machines such as a self-loading forage box, a baler for large bales or the like, in which it is desired to chop the crop after it is picked up from a windrow, for example.

The harvesting machine 10 is of a known configuration and includes a frame 14 that is supported on the ground by wheels 16 and can be coupled to a towing vehicle, not shown, by means of a towbar 18. Furthermore, the frame 14 carries a baling chamber 20 that is surrounded by rolls 22 and that is provided with an inlet 24. The rolls 22 are arranged along a circular line and extend on the one hand in a rear baling chamber section in the form of a discharge gate 26 and on the other hand in a front rigid housing 28. The discharge gate 26 is pivotally coupled to an upper rear location of the housing 26 so that it can be pivoted vertically between a closed working position, as illustrated, and an open discharge position. A crop take up arrangement or pickup 30 is located on the underside of the housing 28 ahead of the inlet 24, and located between the pickup 30 and the inlet 24 is the cutting device 12.

The harvesting machine 10 operates by taking up crop lying on the ground, usually grass, hay or straw, by means of the crop pickup 30, to cut it into small pieces by means of the cutting device 12 and to convey it into the baling chamber 20 where it is baled into a compact bale. By opening the discharge gate 26, the bale is deposited on the ground and can be processed further.

Figure 2:
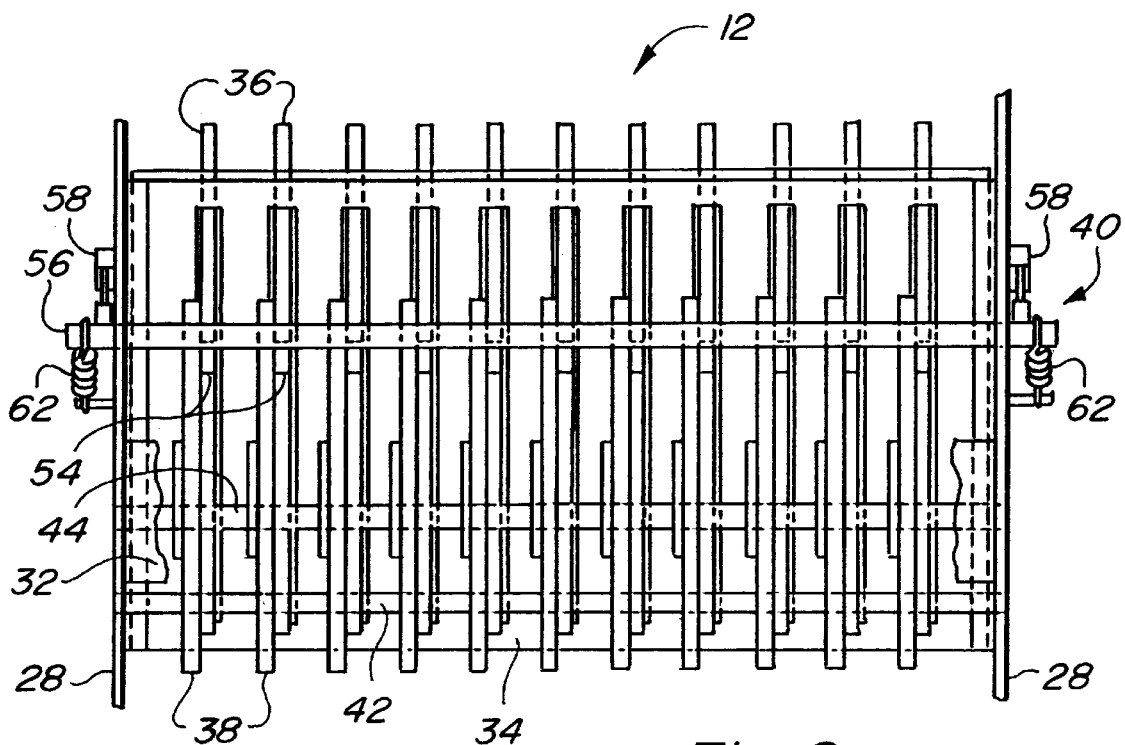
FIG. 2 is a somewhat schematic top plan view of the cutting device according to a first embodiment with all knives in an operating position and with parts broken away for clarity.
Figure 3:
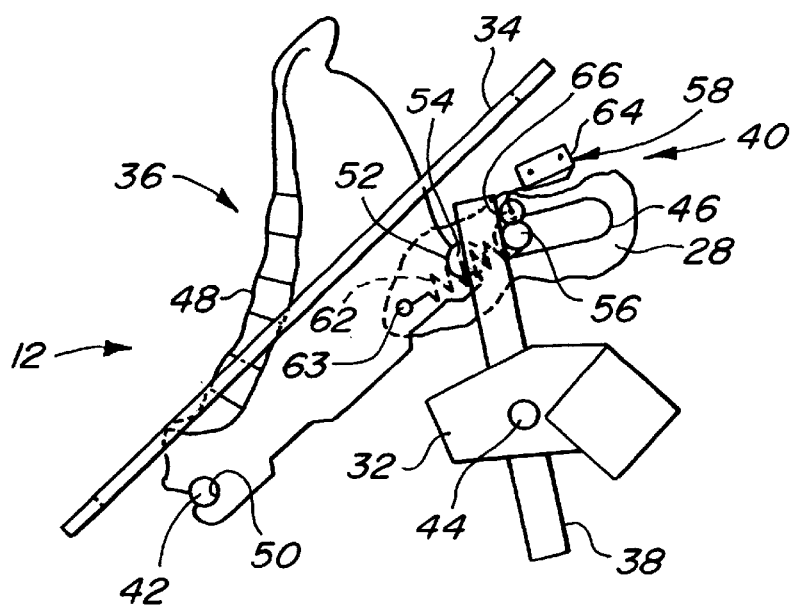
FIG. 3 is a right side view of the cutting device of FIG. 2, but with some of the knife support structure removed for simplicity.

Referring now to the first embodiment, illustrated in FIGS. 2 through 5, it can be seen that the cutting device 12 includes a frame 32, a crop guide plate 34, knives 36, positioning elements 38 and a sensor 40. The frame 32 is fastened to the housing 28 and carries a first axle 42, that extends over the width of the cutting device 12. A second axle 44 extends parallel to the first axle 42 and carries the positioning elements 38 so that they are free to pivot with the axle 44. Finally, located in both side walls of the housing 28 are transversely aligned elongated holes 46. The guide plate 34 is inclined upwardly from front to rear and extends above, and over the entire width of the frame 32 so as to conduct the crop on its path from the crop pickup arrangement 30 to the inlet 24. The guide plate 34 is configured generally as a sheet metal component that contains a plurality of transversely spaced slits 35, not described in further detail, through which the knives 36 extend. In an operating position shown in FIG. 3, the knives 36 extend through the slits 35 with approximately their entire length, while in a non-operating position shown in FIG. 5, the knives 36 are almost entirely below the slits 35. Although the guide plate 34 is shown as a planar plate defining a flat guide surface, it may also be curved. The knives 36 are of a known, generally right triangular configuration, and when in the operating position, shown in FIG. 3, are disposed with the side forming the hypotenuse extending upwardly to the rear and being in the form of a curved, concave cutting edge 48, and with a second side extending generally parallel to the guide surface 34 and defining with the cutting edge 48 a front corner where there is provided with a retaining opening 50, and defining with a third side a rear corner provided with a recess 52. The knives 36 are mounted with their retaining opening 50 on the axle 42 so as to be spaced transversely one from the other. The knives 36 pivot about the axle 42 between their operating and non-operating positions.

Associated with each knife 36 is a positioning element 38 and fixed to an upper forward location of each element 38 is a roll 54, which is received in the recess 52 of an associated knife 36 and remains there as long as the cutting resistance remains below a predetermined level. Each positioning element 38 serves to retain the associated knife 36 in its operating position or to pivot it back to that position or that can be brought into a position in which the knife 36 can intentionally occupy the non-operating position. Each positioning element 38 is spring loaded by a biasing apparatus (not shown) in such a way that the roll 54 constantly engages the recess 52. If a force is applied to a given knife 36 that exceeds the retaining force of the positioning element 38, then the roll 54 moves out of the recess 52 and permits the associated knife 36 to pivot into its non-operating position.

According to the different embodiments of this invention, the sensor 40 is configured in different ways, but is always required to determine whether at least one of the knives 36 is not located in its operating position. In the embodiment shown in FIGS. 2 through 5, the sensor 40 comprises a tie bar 56, left and right switches 58 and left and right springs 62. In this embodiment, the tie bar 56 is configured as a straight, rigid, cylindrical rod, that extends over the entire width of the cutting device 12 and is received in the elongated holes 46. The space of free movement of the tie bar 56 is determined by the size and position of the elongated holes 46. The tie bar 56 is constantly retained in contact with the positioning elements 38 by the springs 62 which are configured as helical extension springs having respective first hooks at first ends engaged with the opposite ends of the bar 56 and respective second hooks at second ends engaged with pins 63 fixed to the housing walls 28. It can be seen that the movement of each knife 36 also brings about a movement of the positioning element 38 and of the tie bar 56. The switches 58 are identical and contain a switch housing 64 and a switch actuator 66. The switch housing 64 is provided with "on-off" contacts (not shown) that are connected by means of leads (not shown) to a warning, control or regulating arrangement that transmits a corresponding signal depending on the position of the actuator. The warning, control or regulating arrangement may be configured in such a way that it does not transmit a corresponding warning or actuating signal when all of the knives 36 have been intentionally brought into the non-operating position and the cutting device 12 is deliberately placed in the non-operating position.

Figure 4:
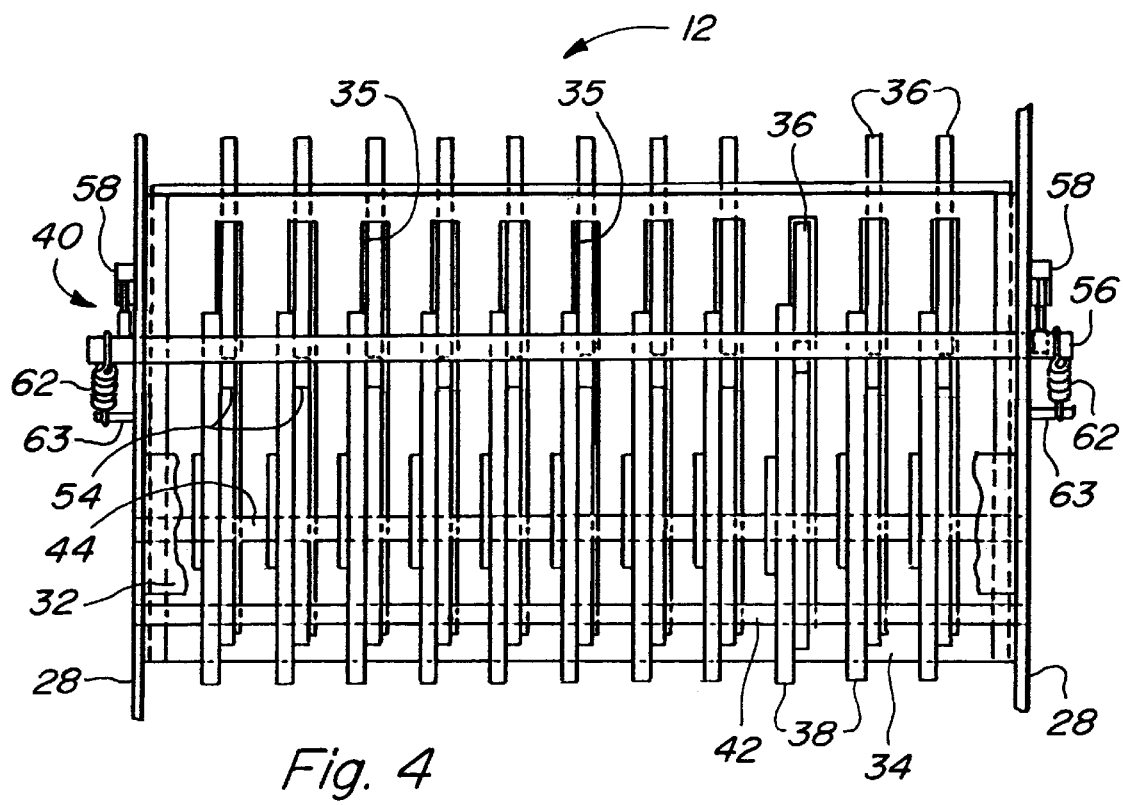
FIG. 4 is a top plan view of the cutting device like that of FIG. 2 but showing one knife not in the operating position.
Figure 5:
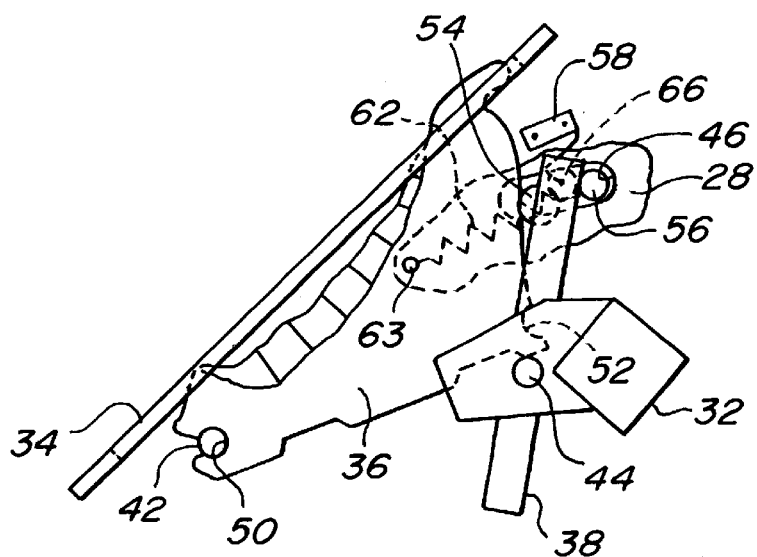
FIG. 5 is a right side view of the cutting device of FIG. 4.

Each switch actuator 66 includes, as is well known, a spring shackle and a roll, that can roll upon the circumference of the tie bar 56. When the tie bar 56 is in the position shown in FIG. 3, each switch 58 occupies a certain switch position, and in the position according to FIG. 5, each switch occupies a different switch position. Preferably, the switch configuration is arranged in such a way that a warning or switch signal is transmitted when the electric circuit is interrupted, which should be the case when one of the knives 36 is in the non-operating position. In this embodiment, each switch 58 is loaded by an end region of the tie bar 56, so that an actuation occurs whenever a knife 36 moves into its non-operating position. While FIGS. 2 and 3 show a situation in which all knives 36 occupy the same position in the operating condition, FIG. 4 shows a situation in which the third knife 36 from the left assumes a non-operating position and deflects the tie bar 56 in such a way that the right switch 58, as seen in the drawing, is actuated and transmits a corresponding signal. The third knife 36 could have been hung up in the non-operating position, for example, due to the effect of a foreign object or to sticky crop juices.

FIGS. 6 and 7 show another embodiment in which a flexible tie element 56', only one switch 58 and only one spring 62 are provided. The tie element 56' is formed by a flexible tensioning device, in particular a rope. One end of the tie element 56' is connected directly to one side of the housing 28 while the other end of the tie element is coupled to the coil spring 62 which in turn is anchored to a bracket fixed to the other side of the housing 28. The tie element 56' is strongly in contact with the back side of all of the positioning elements 38 when the knives 36 are in their operating position, as they are shown in FIG. 6. Although not shown, this tie element 56' could also be guided in recesses on the positioning elements 38 or the knives 36, or extend through closed recesses or holes in the knives 36 or the positioning elements 38.

The single switch 58 is arranged in such a way that the region of the coils of the spring 62 can act upon the switch actuator 66 when the spring 62 is extended in response to being pulled by the tie element 56. A single switch 58 is sufficient since the tie element 56' is tensioned and exerts a pulling force on the spring 62 in every case in which one of the knives 36 is deflected, regardless of its position, so as to cause a corresponding deflection in the associated knife positioning element 38. The spring 62 could also be integrated into the switch housing 64. While the spring 62 and switch 58 are configured in the same way as in the first embodiment, the switch 58 is connected in such a way that it transmits a signal in the depressed position.

FIG. 6 shows the situation in which all the knives 36 are in their operating position, the spring 62 is merely preloaded and the switch 58 is not actuated. FIG. 7 shows a situation in which the third knife 36 from the right side, and consequently the associated positioning element 38 is deflected; the tie element 56' is also deflected and applies tension to the spring 62 so that its coils operate the switch actuator 66 and actuates the switch 58, which results in the circuit embodying the switch 58 being completed or interrupted such as to cause a corresponding signal to occur.

Finally, FIGS. 8 and 9 show a third embodiment in which the sensor 40 includes, in place of the mechanical tie bar 56 or tie element 56', an electrical tie element 67 in the form of a current conductor that is provided with a switch 58' for each knife 36 or positioning element 38. An input cable 68, on the one hand, and an output cable 70, on the other hand, are connected to the electrical tie element 67, which provide current flow. The electrical tie element 67 itself is formed by a multitude of current conductors which respectively cooperate to form the switches 58'. Specifically, referring to FIG. 9, it can be seen that each of the switches 58' is formed by a first conductor 72 fixed to the support 32 and forming a semi-cylindrical receptacle, and a second conductor 74 fixed to a respective knife positioning element 38 and being in the form of a cylindrical rod which is received in the receptacle defined by the first conductor 72 when the positioning element is in its position corresponding to that of the working position of the associated knife 36. The respective structures for respectively mounting the first and second conductors 72 and 74 from the support 32 and knife positioning elements 38 are constructed of suitable materials for insulating these contacts from the support 32 and elements 38. In applications strongly exposed to external dirt, the switches 58' can also be enclosed in themselves and inserted into the frame 32 or the positioning elements 38 and be actuated directly or indirectly as a result of an actuation of the knives 36.

In operation, as the force exerted on one of the knives 36 overcomes the resistance afforded by the associated knife positioning element 38, the roller carried by the latter will move out of the recess provided in the backside of the knife 36 with the result that the knife 36 pivots clockwise about the support axle 42 while the positioning element 38 pivots about the axle 44 to the dashed line position in FIG. 9, which corresponds to the non-working position of the associated knife 36. This pivotal movement of the element 38 results in the disconnection of the associated conductors 72 and 74 from each other and the opening of the circuit established by the electrical tie element 67 so as to result in the activation of an appropriate warning device.

What is claimed is:

1. In a cutting device of an agricultural baling machine including a plurality of knives arranged in transversely spaced relationship to each other across a crop flow path, with the knives each being mounted for movement between an operating position projecting into the path and a non-operating position withdrawn from the path, the improvement comprising: a sensor associated with the knives for initiating a signal if at least one of the knives is located in a position which differs from that of at least one other knife.

2. The cutting device as defined in claim 1 wherein each of said knives has a positioning element associated therewith and mounted for movement, together with the associated knife, between first and second positions corresponding to said operating and non-operating positions of said knife; said sensor including a tie element associated with the knife positioning element so as to initiate a change in said sensor in response to said at least one knife changing its position relative to that of said at least one other knife.

3. The cutting device as defined in claim 2 wherein said tie element is in the form of a rigid bar mounted in engagement with each of said knife positioning elements and moveable in response to movement by the positioning element associated with said at least one of the knives.

4. The cutting device as defined in claim 3 wherein said sensor includes at least one switch having a switch element mounted for movement in response to movement of said rigid bar.

5. The cutting device as defined in claim 4 wherein said cutting device extends between transversely spaced housing walls; said spaced housing walls being provided with transversely aligned, elongate slots having opposite end portion of said rigid bar extending therethrough; a biasing arrangement coupled to said rigid bar for yieldably urging it against each of said knife positioning elements; said at least one switch being mounted to one of said housing walls and a second switch being mounted to another of said housing walls; said switch element of said at least one switch and a second switch element of said second switch each including a roller engaged with said rigid bar so as to effect like a first conditions in said switches, when said rigid bar is in a first position corresponding to said positioning elements all being in said position corresponding to said knives each being in said working position, and one end of said rigid bar being moved away from the associated switch element, so as to establish a second condition in the associated switch, in response to one of said knives moving to said non-working position.

6. The cutting device defined in claim 2 wherein said tie element is in the form of a flexible, elongate element mounted so as to be in engagement with all of said knife positioning elements when said knives are in their working positions; one end of said flexible, elongate element being fixed and the other end being coupled to a spring having a portion which is pulled between first and second locations in response to one of said knife positioning elements moving in response to the associated knife moving between said working and non-working positions; and a switch having a switch element mounted for engagement by said spring when said spring moves between said first and second locations so as to effect a change in the operating condition of said switch.

7. The cutting device as set forth in claim 6 wherein said spring is a helical spring and said portion is an end of a coiled portion of said spring.

8. The cutting device as set forth in claim 2 wherein said sensor includes an electrical conductor having a plurality of switches respectively associated with said knife positioning elements; said plurality of switches each including a first conducting element carried by an associated one of said knife positioning elements and a second conducting element carried by a support in the vicinity of said conductor; and said first and second conducting elements cooperating with each other to complete a circuit through said conductor when all of said knife positioning elements are in one of said working and non-working positions, and being separated from each other to establish an open circuit through said conductor when at least one of said knife positioning elements is in said non-working position.

\* \* \* \* \*